United States Patent
Langlais et al.

(10) Patent No.: US 9,322,109 B2
(45) Date of Patent: Apr. 26, 2016

(54) ELECTRO-CHEMICALLY MACHINING WITH A MOTOR PART INCLUDING AN ELECTRODE

(71) Applicant: Seagate Technology LLC, Cupertino, CA (US)

(72) Inventors: Timothy Edward Langlais, Minneapolis, MN (US); Chris M. Woldemar, Santa Cruz, CA (US); Troy M. Herndon, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 363 days.

(21) Appl. No.: 13/957,354

(22) Filed: Aug. 1, 2013

(65) Prior Publication Data

US 2015/0034494 A1 Feb. 5, 2015

(51) Int. Cl.
| | |
|---|---|
| *B23H 3/00* | (2006.01) |
| *B23H 7/38* | (2006.01) |
| *B23H 7/00* | (2006.01) |
| *C25F 3/16* | (2006.01) |
| *B23H 11/00* | (2006.01) |
| *C25F 3/02* | (2006.01) |
| *B23H 9/00* | (2006.01) |

(52) U.S. Cl.
CPC .. *C25F 3/16* (2013.01); *B23H 7/38* (2013.01); *B23H 9/00* (2013.01); *B23H 11/003* (2013.01); *C25F 3/02* (2013.01); *B23H 3/00* (2013.01); *B23H 2200/10* (2013.01); *B23H 2400/10* (2013.01)

(58) Field of Classification Search
CPC .......... B23H 3/00; B23H 11/003; B23H 7/38; B23H 2200/10; B23H 2400/10
USPC ................. 205/640, 651; 204/297.02, 297.01
See application file for complete search history.

(56) References Cited

U.S. PATENT DOCUMENTS

| | | | |
|---|---|---|---|
| 5,310,468 A | 5/1994 | Bruns et al. | |
| 6,582,578 B1 * | 6/2003 | Dordi ..................... | C25D 21/00 204/212 |
| 6,866,769 B2 | 3/2005 | Anderson et al. | |
| 6,946,062 B2 * | 9/2005 | Lin .......................... | C25F 7/00 204/224 M |
| 7,501,049 B2 | 3/2009 | Schmidt | |
| 2011/0247943 A1 * | 10/2011 | Bialas ..................... | C25F 3/16 205/671 |
| 2011/0290662 A1 | 12/2011 | Matt et al. | |
| 2012/0217163 A1 | 8/2012 | Collins et al. | |
| 2012/0267254 A1 | 10/2012 | Clasquin et al. | |

* cited by examiner

*Primary Examiner* — Nicholas A Smith
*Assistant Examiner* — Brian W Cohen

(57) ABSTRACT

A method includes rotating a first motor part around a first structure substantially similar to a second motor part. The method also includes applying a first current to the first structure to electro-chemically machine the first motor part.

18 Claims, 7 Drawing Sheets

ELECTRO-CHEMICALLY MACHINING WITH A MOTOR PART INCLUDING AN ELECTRODE

BACKGROUND

An electric motor may use stators, magnets, and/or coils to rotate an object. For example, a motor may rotate data storage disks used in a disk drive storage device. The data storage disks may be rotated at high speeds during operation using the stators, magnets, and/or coils. For example, magnets and coils may interact with a stator to cause rotation of the disks relative to the stator.

In some cases, electric motors are manufactured with increasingly reduced sizes. For example, in order to reduce the size of a disk drive storage device, the size of various components of the disk drive storage device may be reduced. Such components may include the electric motor, stator, magnets, coils, and motor parts. The precision at which the stators, magnets, coils and motor parts are manufactured may affect the acoustical properties and performance of the electric motor.

SUMMARY

A method includes rotating a first motor part around a first structure substantially similar to a second motor part. The method also includes applying a first current to the first structure to electro-chemically machine the first motor part.

These and other aspects and features of embodiments may be better understood with reference to the following drawings, description, and appended claims.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Figure 1A:
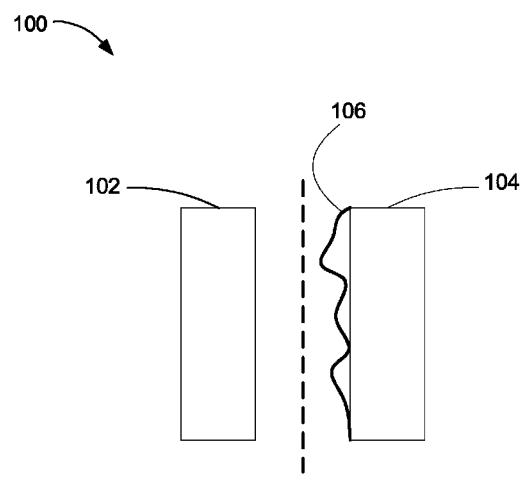
FIG. 1A provides a cross-sectional perspective of two motor parts having a form variance between the two parts, according to one aspect of the present embodiments.

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Disks of a hard disk drive ("HDD"), such as that of FIG. 8 described herein below, may be rotated at high speeds by means of an electric motor including a spindle assembly mounted on a base of a housing. Such electric motors include a stator assembly including a number of stator teeth, each extending from a yoke. Each stator tooth of the number of stator teeth supports a field coil that may be energized to polarize the field coil. Such electric motors further include one or more permanent magnets disposed adjacent to the number of stator teeth. As the number of field coils disposed on the number of stator teeth are energized in alternating polarity, the magnetic attraction or repulsion of a field coil to an adjacent permanent magnet causes the spindle, including a hub, of the spindle motor assembly to rotate, thereby rotating the disks for read/write operations by one or more read-write heads.

Various means may be used to manufacture motor parts. For example, motor parts may be manufactured by cutting a motor part out of a piece of material. This manufacturing of motor parts may result in variances in form that can result in unevenness and other variations in the surfaces of the motor parts. The finishing of motor parts may include grinding of motor parts to finish motor parts thereby bringing the variances of the motor parts within specified limits. However, the tolerances of acceptable variations continue to shrink as motors and the corresponding motor parts are made smaller and smaller.

Aligning various motor parts is often difficult because aligning processes may be manual, labor intensive, crude, and inaccurate. For example, various motor parts, including a shaft and a hub, may be aligned by hammering them into alignment. In addition, a secondary machining or correction step may be added to correct variations. These processes may be inaccurate and time consuming.

On the other hand and according to embodiments described herein, using electro-chemical machining (ECM) allows improved form tolerances and/or reduced tolerance of size of motor parts, by providing more precise finishing and/or reduction of variances. Electro-chemical machining may be used to improve the form tolerances or geometric tolerances of a motor part including, for example, flatness, roundness, taper, cylindricity, etc. In some embodiments, electro-chemical machining is used to improve the form of a motor part as the motor part is rotated. Embodiments thereby simulate the operating state of a motor part, and use electro-chemical machining to improve the alignment (e.g., perpendicularity) between motor parts. Embodiments further allow the use of motor part like components or motor parts configured for use in electro-chemical machining of other motor parts. Some embodiments eliminate secondary machining or correction.

FIG. 1A provides a cross-sectional perspective of two motor parts having a form variance between the two parts, according to one aspect of the present embodiments. Diagram 100 includes motor part 102 and motor part 104. In some embodiments, motor part 104 rotates with respect to motor part 102. Motor part 104 includes surface 106 which has surface variations (e.g., waviness), as shown. The variations in surface 106 may result from the manufacturing of motor part 104 (e.g., lathe cutting). As motor part 104 rotates around motor part 102, the variations of surface 106 may result in undesirable performance characteristics (e.g., acoustical tones, reduced speed, vibrations, etc.). Embodiments are configured to reduce and/or remove variations in surface 106.

Figure 1B:
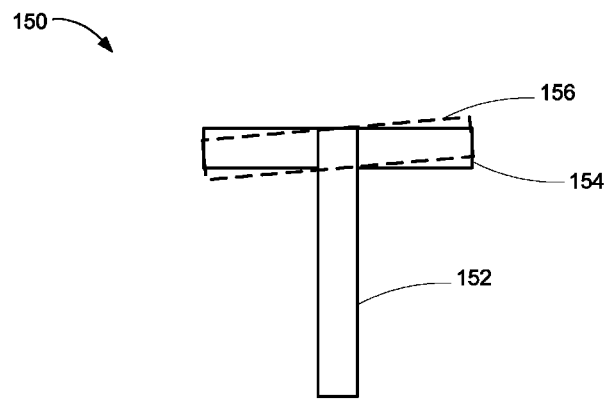
FIG. 1B provides a cross-sectional perspective of rotation of a spinning assembly, according to one aspect of the present embodiments.

FIG. 1B provides a cross-sectional perspective of rotation of a spinning assembly, according to one aspect of the present embodiments. Spinning assembly 150 includes motor part 152 (e.g., shaft) and motor part 154 (e.g., hub). Outline 156 illustrates motion (e.g., non-perpendicular motion relative to motor part 152) of motor part 154 during rotation of motor part 154 about motor part 152. Embodiments are configured to modify the form of motor part 154 thereby enhancing the precision of the motion of motor part 154.

Spinning assembly 150 may be used to simulate an operating state (e.g., using relative motion) where electro-chemical machining is used to improve the perpendicularity of the alignment between motor part 152 and motor part 154. For example, the electro-chemical machining may machine more of the portions of motor part 154 that are closer to an electrode thereby resulting in motor part 154 having a relative parallel surface relative to the electrode. In some embodiments, perpendicularity, surface finish, and taper are modified (e.g., with electro-chemical machining). Embodiments thereby are configured to create a substantially axisymmetric sub-assembly. Embodiments further support a spinning assembly including an electrode thereby allowing electro-chemical machining of a stationary motor part with a rotating part (e.g., rotating electrode).

Figure 2:
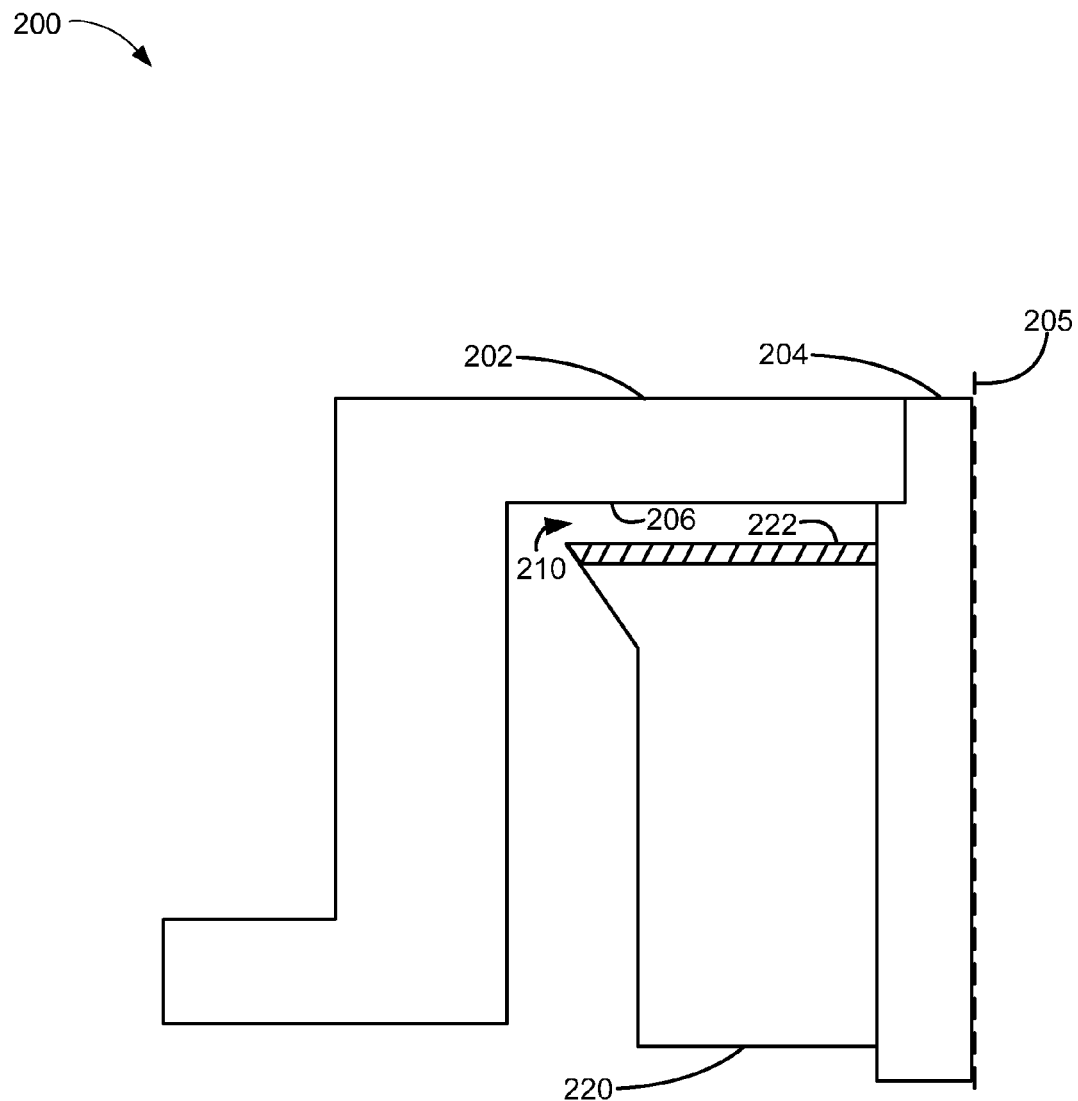
FIG. 2 provides a cross-sectional perspective of an exemplary assembly for electro-chemically machining a motor part, according to one aspect of the present embodiments.

FIG. 2 provides a cross-sectional perspective of an exemplary assembly for electro-chemically machining a motor part, according to one aspect of the present embodiments. Assembly 200 includes hub 202, shaft 204, and sleeve like structure or component 220. In some embodiments, sleeve like component 220 is configured to simulate a portion of a motor. Hub 202 is coupled to shaft 204 and hub 202 is configured to rotate about a rotation axis 205 of shaft 204. Hub 202 is further configured to rotate about shaft 204 and sleeve like component 220. Shaft 204 is configured to rotate within sleeve like component 220.

Sleeve like component 220 includes electrode 222. Electrode 222 may be configured to electro-chemically machine a first form tolerance and/or reduced tolerance of size of surface 206 of hub 202. Thus, sleeve like component 220 is configured to electro-chemically machine hub 202 (e.g., surface 206 of hub 202). In some embodiments, sleeve like component 220 is separated from hub 202 by gap 210. In some embodiments, the electro-chemical machining may machine more of portions of surface 206 that are closer to electrode 222 thereby resulting in surface 206 having a relative parallel surface relative to electrode 222.

In some embodiments, surface 206 may be machined with respect to the rotation axis of hub 202. For example, the hub 202 may rotate about the rotation axis 205, and the surface 206 is electro-chemically machined by the electrode 222 during rotation. Thus, the electro-chemical machining may be done in an environment that simulates an operating environment for the hub 202 and shaft 204.

Figure 3:
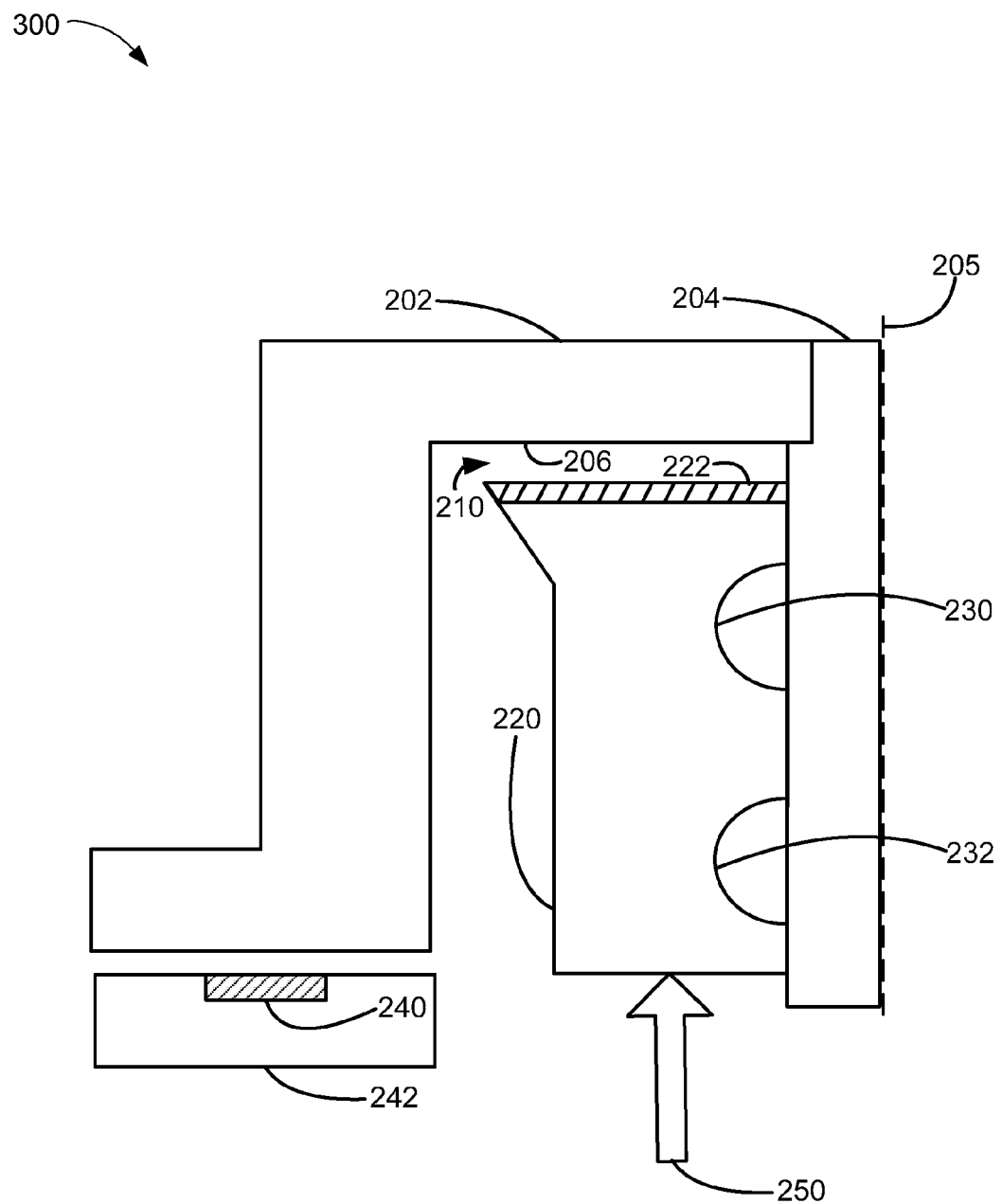
FIG. 3 provides a cross-sectional perspective of an exemplary assembly for electro-chemically machining a motor part, the assembly including a magnet configured for biasing a motor component, according to one aspect of the present embodiments.

FIG. 3 provides a cross-sectional perspective of an exemplary assembly for electro-chemically machining a motor part, the assembly including a magnet configured for biasing a motor component, according to one aspect of the present embodiments. Assembly 300 includes hub 202, shaft 204, sleeve like component 220, and component 242. In some embodiments, sleeve like component 220 is configured to simulate a portion of a motor. Hub 202 is coupled to shaft 204, and configured to rotate about a rotation axis 205 (e.g. a center of rotation). Hub 202 is further configured to rotate about sleeve like component 220. Shaft 204 is configured to rotate within sleeve like component 220.

Sleeve like component 220 includes electrode 222. Current 250 is applied to electrode 222 of sleeve like component 220 thereby facilitating electro-chemical machining of surface 206 of hub 202. In some embodiments, sleeve like component 220 is separated from hub 202 by gap 210. In some embodiments, sleeve like component 220 forms fluid dynamic bearings 230 and 232 (e.g., journal bearings) with the shaft 204. In some embodiments, a fluid is added to allow hub 202 to rotate in a simulation of a natural operating environment within a hard drive device (e.g., the fluid flows through bearings 230 and 232 and the shaft 204 rotates within a sleeve). In various embodiments, the fluid is an electrolyte configured for use in the electro-chemical machining of hub 202.

Component 242 includes magnet 240 configured for biasing rotation of hub 202 (e.g., during electro-chemical machining of hub 202). In some embodiments component 242 is coupled to sleeve like component 220. In various embodiments, sleeve like component 220, component 242 and/or magnet 240 are substantially similar to motor parts that hub 202 will be used with after electro-chemical machining of hub 202. For example, component 242 and magnet 240 may simulate a base and annular bias ring, and the sleeve like component 220 may simulate the sleeve.

Thus, the operating environment of a disk drive is simulated during the electro-chemical machining process. In some embodiments, sleeve like component 220, component 242, magnet 240, and/or other parts of the drive may be the actual motor parts that the hub 202 will be used with in the disk drive after electro-chemical machining of hub 202. Therefore, the operating environment of the hub 202 may be as closely simulated as possible during the electro-chemical machining process.

Figure 4:
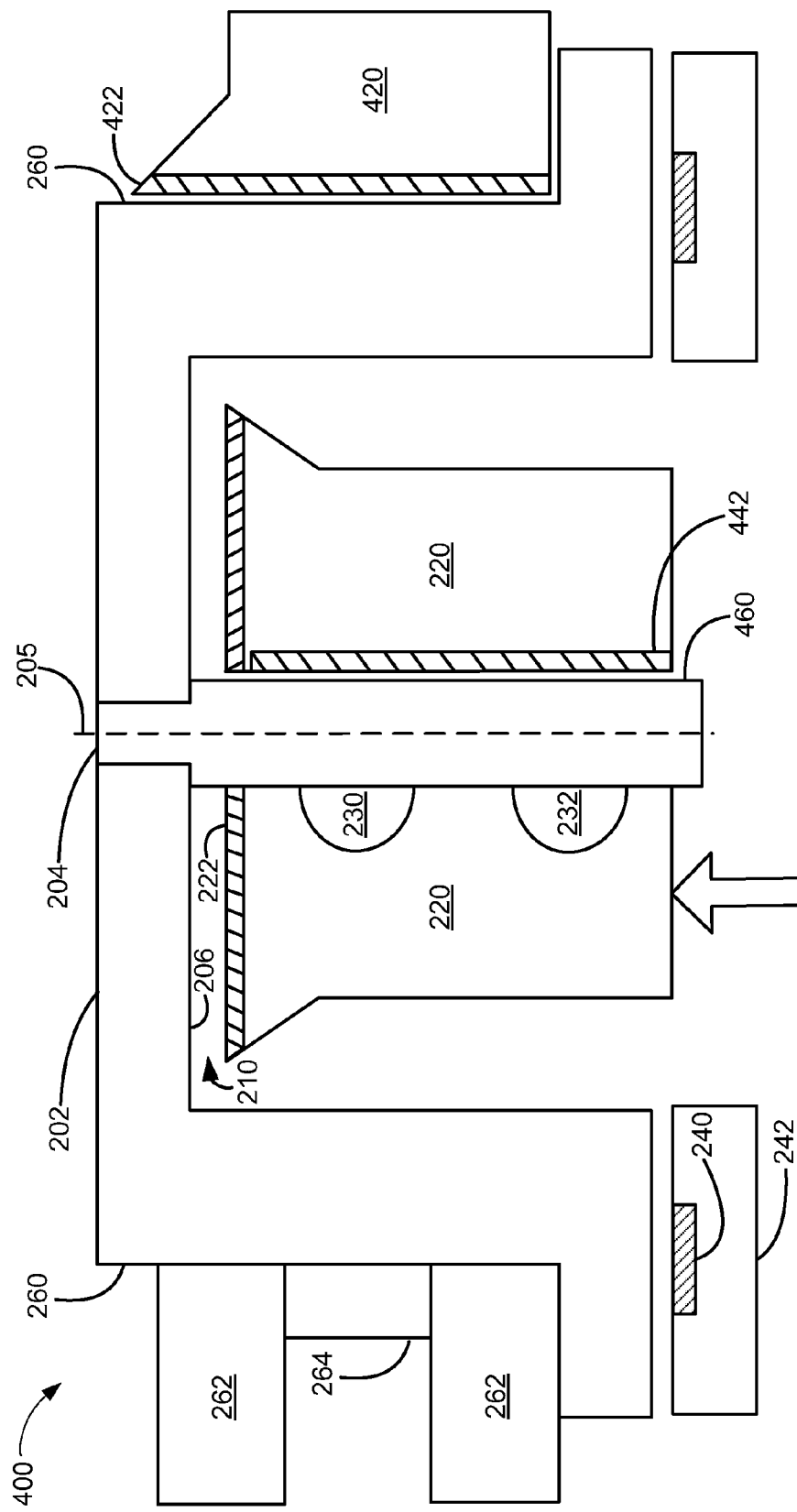
FIG. 4 provides a cross-sectional perspective of an exemplary hub having a number of surfaces for electro-chemical machining, according to one aspect of the present embodiments.

FIG. 4 provides a cross-sectional perspective of an exemplary hub having a number of surfaces for electro-chemical machining, according to one aspect of the present embodiments. Assembly 400 includes hub 202, shaft 204, sleeve like component 220, and component 242. In some embodiments, sleeve like component 220 is configured to simulate a portion of a motor. Hub 202 is coupled to shaft 204 and hub 202 is configured to rotate about a rotation axis 205. Hub 202 is further configured to rotate about sleeve like component 220. Shaft 204 is configured to rotate within sleeve like component 220.

Sleeve like component 220 includes electrode 222. Current 250 is applied to electrode 222 of sleeve like component 220 thereby facilitating electro-chemical machining of first surface 206 of hub 202. Sleeve like component 220 forms bearings 230 and 232 (e.g., journal bearings) with the shaft 204. In some embodiments, a fluid is added to allow shaft 204 to rotate within the sleeve like component 220 (e.g., the fluid flows through bearings 230 and 232).

In various embodiments, the electrode may rotate, and the surface to be machined may be stationary. Thus, for example, the sleeve like component 220 and the electrode 222 may rotate about the rotation axis 205. Furthermore, the hub 202 and the shaft 204 are stationary. Therefore, the rotating electrode 222 electro-chemically machines stationary surfaces (e.g. first surface 206).

Component 242 includes magnet 240 configured for biasing rotation of hub 202. In some embodiments, sleeve like component 220 is separated from hub 202 by gap 210. Magnet 240 may attract a portion of hub 202 thereby allowing magnet 240 to be used to configure the characteristics (e.g., size) of gap 210. The characteristics of gap 210 may further be controlled based on flow rate of the fluid (e.g., electrolyte) during rotation of hub 202.

In a disk drive, one or more magnetic disks 262 may be mounted on hub 202 and may be separated by a spacer 264. Therefore in some embodiments, second surface 260 of hub 202 is electro-chemically machined to reduce form variations and improve rotation precision of magnetic disks 262. In these embodiments, assembly 400 includes a machining assembly 420 including a second electrode 422 configured to electro-chemically machine a form tolerance and/or reduced tolerance of size of second surface 260 of the hub 202 via the second electrode 422. In various embodiments, surfaces 206 and 260 may be electro-chemically machined concurrently.

In still further embodiments, third surface 460 of shaft 204 is electro-chemically machined to reduce form variations and improve rotation precision within a sleeve (e.g. simulated by sleeve like component 220). In these embodiments, sleeve like component 220 includes a third electrode 442 configured to electro-chemically machine a form tolerance and/or reduced tolerance of size of third surface 460 of the shaft 204 via the third electrode 442. In various embodiments, surfaces 206, 260, and/or 460 may be electro-chemically machined concurrently. The form tolerances and/or reduced tolerance of size of surfaces 206, 260, and 460 may be selected from the group consisting of, for example, flatness, roundness, cylindricity, perpendicularity, taper, run out, etc. Thus in still even further embodiments, other surfaces of the drive components may also be electro-chemically machined in simulated working environments.

Figure 5:
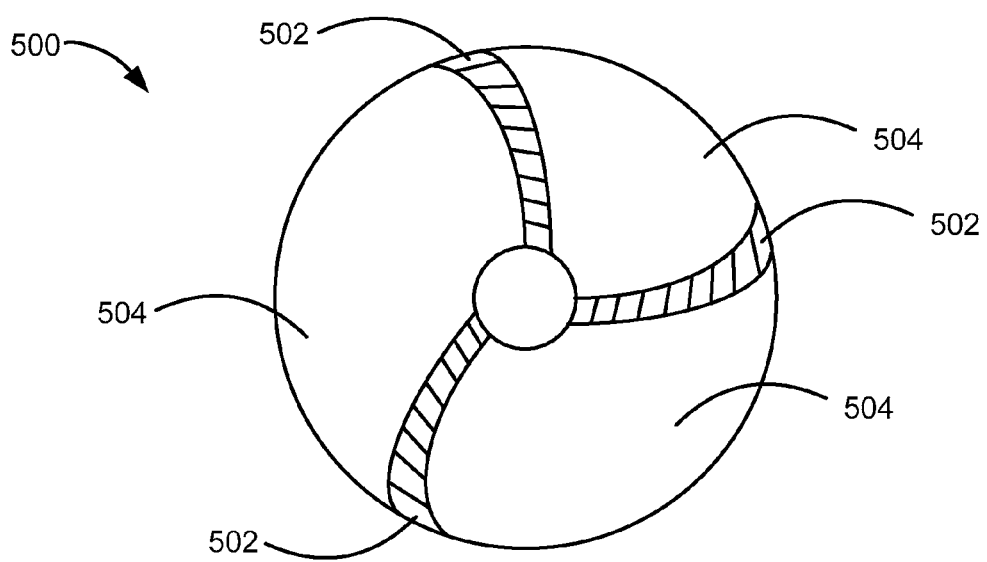
FIG. 5 provides a top view perspective of an exemplary component substantially similar to a motor part configured for electro-chemical machining, according to one aspect of the present embodiments.

FIG. 5 provides a top view perspective of an exemplary component substantially similar to the motor part configured for electro-chemical machining (e.g. sleeve like component 220, FIG. 2), according to one aspect of the present embodiments. Sleeve like component 500 includes electrode portions 502 and insulator portions 504. Electrode portions 502 are configured for electro-chemical machining of a motor part (e.g., hub 202, FIG. 2). In some embodiments, electrode portions 502 are configured (e.g., shaped and sized) to allow precise electro-chemical machining (e.g., based on controlling current flow, distance to the motor part being machined, etc.). Insulator portions 504 include an insulator configured to facilitate current flow through electrode portions 502.

Electrode portions 502 may be configured to allow control of the amount of current flowing through electrode portions 502 (e.g., to ensure more even current flow through the gap between electrode portions 502 and the motor part being electro-chemically machined). Thus, electrode portions 502 may be configured to concentrate current and allow control of the current at localized regions, as compared to using the surface (e.g., entire surface) of a sleeve like component. Insulation portions 504 may have a different (e.g., shorter or taller) or same respective vertical height as electrode portions 502.

Figure 6:
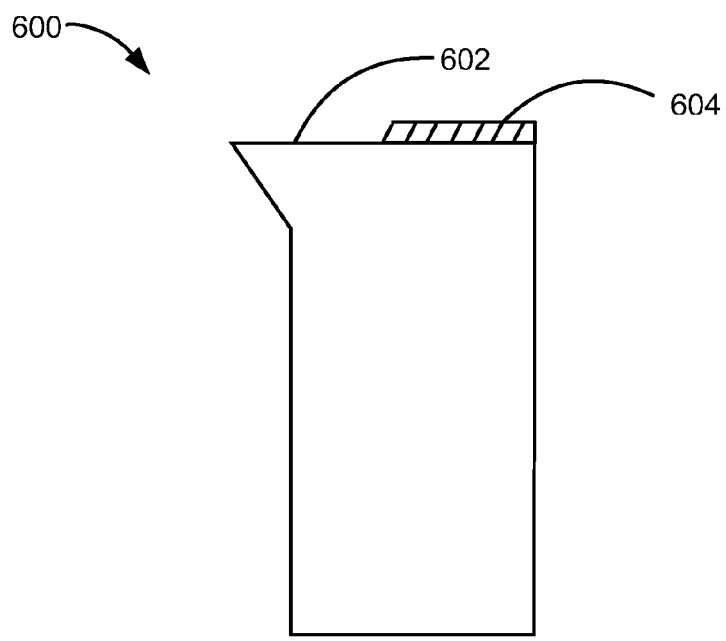
FIG. 6 provides a cross-sectional perspective of an exemplary component substantially similar to a motor part having a first portion of a first height and a second portion having a second height, according to one aspect of the present embodiments.

FIG. 6 provides a cross-sectional perspective of an exemplary component substantially similar to motor part including a first portion having a first height and a second portion having a second height, according to one aspect of the present embodiments. Sleeve like component 600 includes surface 602 and electrode portion 604. In some embodiments, electrode portion 604 extends to a height above surface 602 of sleeve like component 600. Electrode portions 604 may thus be closer to a surface of a motor part to be electro-chemically machined as compared to surface 602 of sleeve like component 600. In some embodiments, surface 602 may include an insulation portion (e.g., insulator portions 504, FIG. 5).

Figure 7:
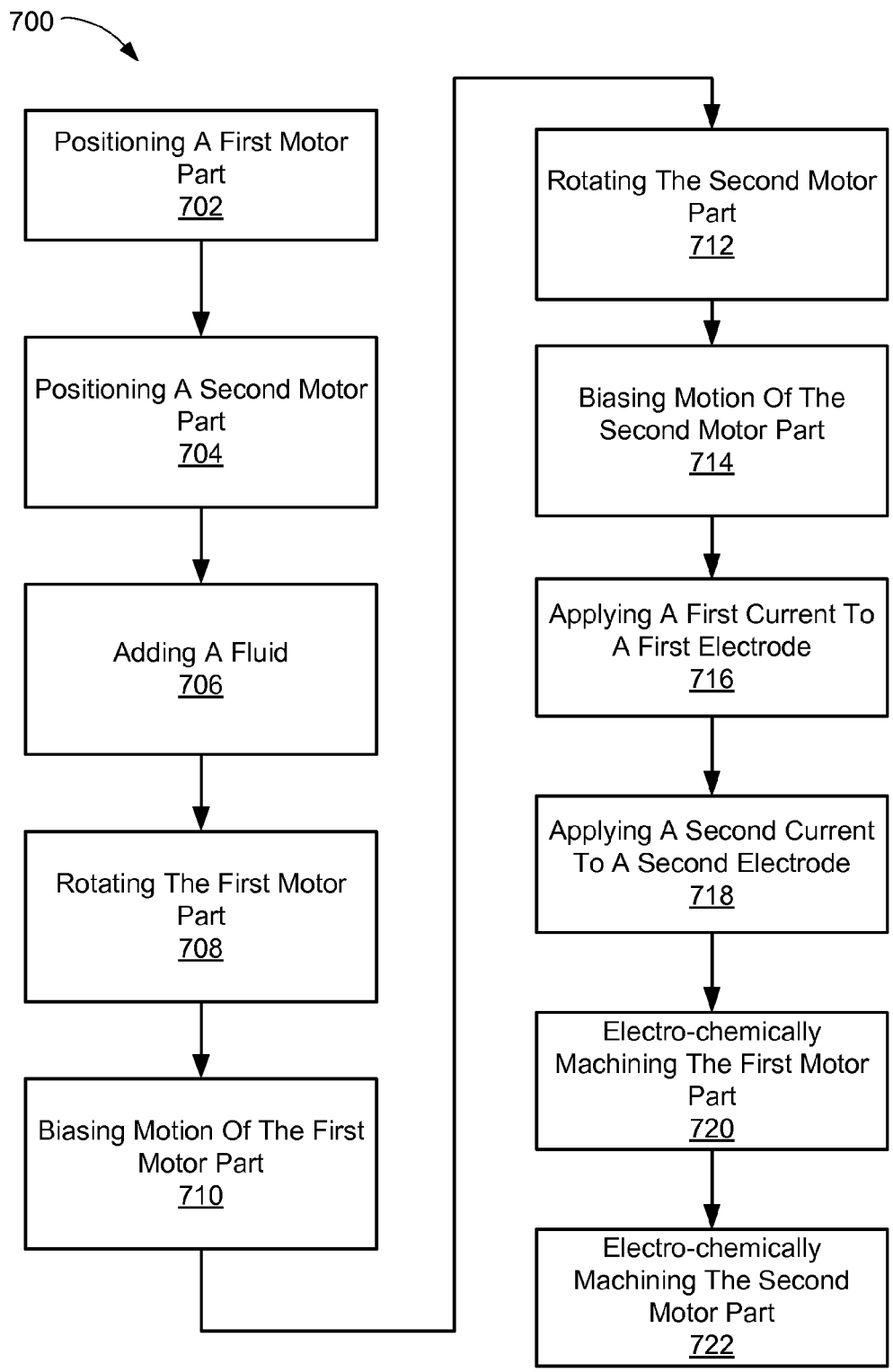
FIG. 7 shows an exemplary flow diagram for electro-chemically machining a motor part, according to one aspect of the present embodiments.

FIG. 7 shows an exemplary flow diagram for electro-chemically machining a motor part, according to one aspect of the present embodiments. Flowchart 700 depicts a process for electro-chemically machining one or more motor parts. The process of flowchart 700 may be used to electro-chemically machine a hub, a thrust washer, a sleeve, and/or various other motor parts. The process of flowchart 700 may be used to electro-chemically machine a variety of materials (e.g. steel, bronze, brass, etc.).

At block 702, a first motor part is positioned. In various embodiments, the first motor part includes a surface relative to an electrode. The positioning configures the surface to be electro-chemically machined by the electrode of a first component or structure. In some embodiments, the first component is substantially similar to a motor component. In various embodiments, the electrode is at a surface portion of the first component. In one exemplary embodiment, the first component is substantially similar to a motor sleeve. In various embodiments, the first component or structure is configured to be a portion of an electric motor. In some embodiments, the motor part is a motor part having a form tolerance to be altered (e.g. improved). In one exemplary embodiment, the motor part is a hub selected to have form tolerances and/or reduced tolerance of size improved.

At block 704, a second motor part is positioned. In some embodiments, the second motor is connected to the first motor part. In various embodiments, the second motor part is independent from the first motor part. In some embodiments, the second motor part is optional and blocks 704, 712, 714, 718, and 722 are optional.

In various embodiments, the second motor part may be configured to rotate relative to the first component. In some embodiments, a hub is coupled to a shaft and the hub is configured to be rotated around a sleeve like component, and the shaft rotates within the sleeve like component.

At block 706, a fluid is added. In some embodiments, the fluid is added between the first motor part and the first component (e.g., substantially similar to a motor sleeve). In various embodiments, the fluid comprises an electrolyte configured for electro-chemically machining, and the fluid is further configured to form a fluid dynamic bearing with the first component and the first motor part. In some embodiments, an air bearing may be used and block 706 may be optional.

At block 708, the first motor part is rotated. In one exemplary embodiment, a hub is rotated relative to the sleeve like component.

At block 710, motion of the first motor part is biased. In some embodiments, a magnet is used to bias motion of the first motor part.

At block 712, the second motor part is rotated. In one exemplary embodiment, a shaft is rotated within a sleeve like component.

At block 714, motion of the second motor part is biased. In some embodiments, a magnet is used to bias motion of the second motor part.

At block 716, a first current is applied to a first electrode. In some embodiments, the first electrode is configured to electro-chemically machine the first motor part. In various embodiments, the applying of the first current is configured to machine the first motor part. In one exemplary embodiment, the first component is substantially similar to a motor sleeve includes an electrode and is configured to electro-chemically machine a hub (e.g., FIGS. 2-6). In various embodiments, the applying of the first current to the first electrode is configured to modify the form of the motor part and the form is selected from the group consisting of flatness, roundness, cylindricity, perpendicularity, taper, run out, etc.

At block 718, a second current is applied to a second electrode. In some embodiments, a sleeve like component includes the second electrode. In various embodiments, the second electrode may be positioned relative to a vertical surface of a hub.

At block 720, the first motor part is electro-chemically machined. In some embodiments, the first motor part is a hub and the electro-chemical machining is performed on a first surface of the first motor part via the first electrode. In various embodiments, a second surface of the first motor part is electro-chemically machined via the second electrode. In one exemplary embodiment, the first motor part is a hub and the electro-chemical machining is performed on a first surface of the hub via the first electrode (e.g., on a sleeve) and on a second surface (e.g., surface configured for coupling to a magnetic disk) via the second electrode.

At block 722, the second motor part is electro-chemically machined. In one exemplary embodiment, the second motor part is a shaft connected to a hub and the shaft is electro-chemically machined via the second electrode of a sleeve like component.

The blocks of flowchart 700 may be performed using various process factors including the duration of the current, the amount of current, the salinity (e.g., of a fluid acting as a bearing and as an electrolyte), strength of the electrolyte, temperature, flow rate of the electrolyte, shape of the electrode, characteristics of the gap between surfaces (e.g., the surface of the electrode and the surface being electro-chemically machined).

Figure 8:
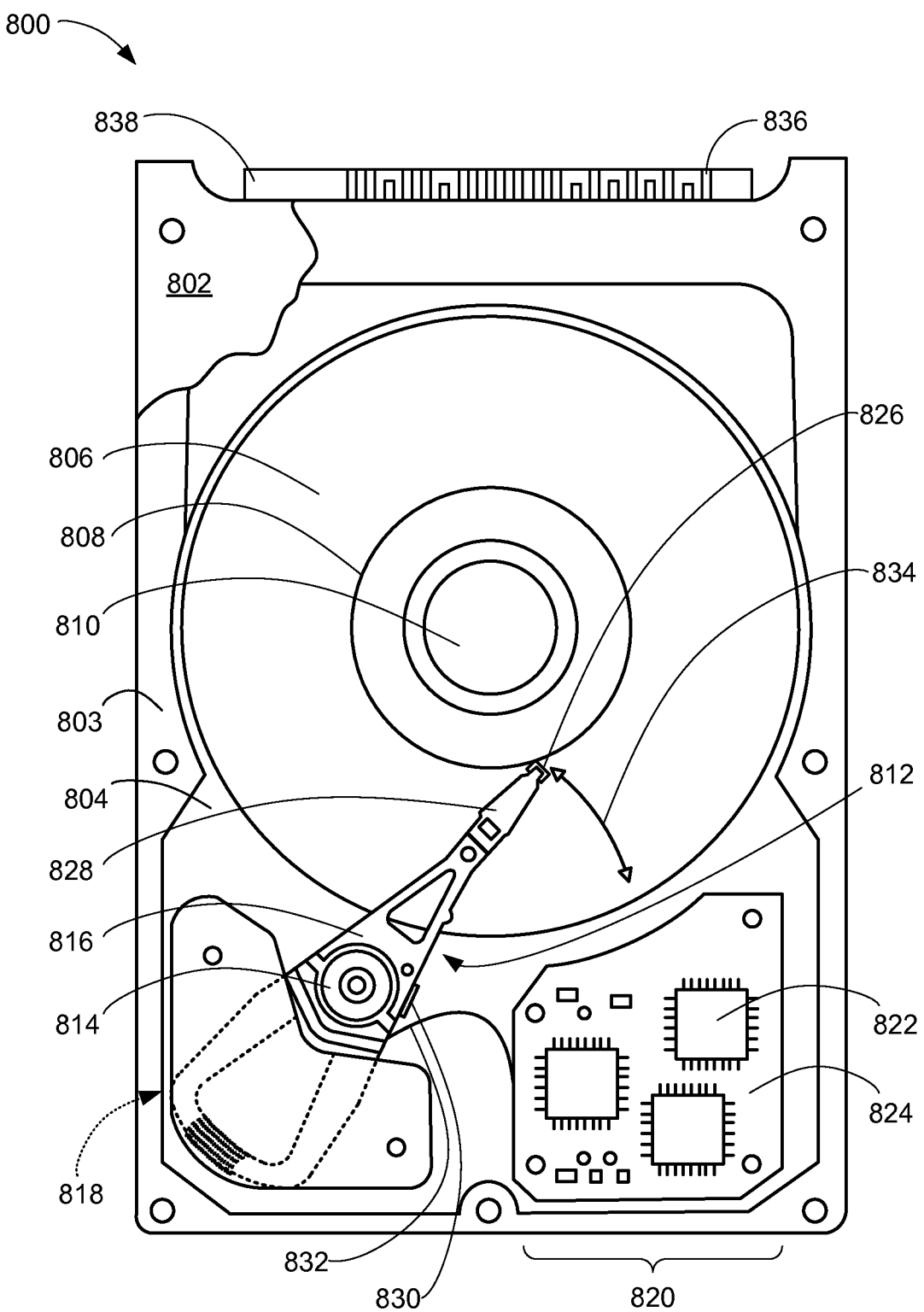
FIG. 8 provides a plan view of a hard disk drive including the formed motor components described herein, according to one aspect of the present embodiments.

FIG. 8 provides a plan view of a hard disk drive 800, which hard disk drive may use the formed motor components described herein. Hard disk drive 800 may include a housing assembly including a cover 802 that mates with a base deck having a frame 803 and a floor 804, which housing assembly provides a protective space for various hard disk drive components. The hard disk drive 800 includes one or more data storage disks 806 of computer-readable data storage media. Typically, both of the major surfaces of each data storage disk 806 include a number of concentrically disposed tracks for data storage purposes. Each data storage disk 806 is mounted on a hub 808, which in turn is rotatably interconnected with the base deck and/or cover 802. The hub 808 may have been electro-chemically machined (as described above). Multiple data storage disks 806 are typically mounted in vertically spaced and parallel relation on the hub 808. A spindle motor assembly 810 rotates the data storage disks 806.

The hard disk drive 800 also includes an actuator arm assembly 812 that pivots about a pivot bearing 814, which in turn is rotatably supported by the base deck and/or cover 802. The actuator arm assembly 812 includes one or more individual rigid actuator arms 816 that extend out from near the pivot bearing 814. Multiple actuator arms 816 are typically disposed in vertically spaced relation, with one actuator arm 816 being provided for each major data storage surface of each data storage disk 806 of the hard disk drive 800. Other types of actuator arm assembly configurations could be utilized as well, an example being an "E" block having one or more rigid actuator arm tips, or the like, that cantilever from a common structure. Movement of the actuator arm assembly 812 is provided by an actuator arm drive assembly, such as a voice coil motor 818 or the like. The voice coil motor 818 is a magnetic assembly that controls the operation of the actuator arm assembly 812 under the direction of control electronics 820. The control electronics 820 may include a number of integrated circuits 822 coupled to a printed circuit board 824. The control electronics 820 may be coupled to the voice coil motor assembly 818, a slider 826, or the spindle motor assembly 810 using interconnects that can include pins, cables, or wires (not shown).

A load beam or suspension 828 is attached to the free end of each actuator arm 816 and cantilevers therefrom. Typically, the suspension 828 is biased generally toward its corresponding data storage disk 806 by a spring-like force. The slider 826 is disposed at or near the free end of each suspension 828. What is commonly referred to as the read-write head (e.g., transducer) is appropriately mounted as a head unit (not shown) under the slider 826 and is used in hard disk drive read/write operations. The head unit under the slider 826 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 826 is connected to a preamplifier 830, which is interconnected with the control electronics 820 of the hard disk drive 800 by a flex cable 832 that is typically mounted on the actuator arm assembly 812. Signals are exchanged between the head unit and its corresponding data storage disk 806 for hard disk drive read/write operations. In this regard, the voice coil motor 818 is utilized to pivot the actuator arm assembly 812 to simultaneously move the slider 826 along a path 834 and across the corresponding data storage disk 806 to position the head unit at the appropriate position on the data storage disk 806 for hard disk drive read/write operations.

When the hard disk drive 800 is not in operation, the actuator arm assembly 812 is pivoted to a "parked position" to dispose each slider 826 generally at or beyond a perimeter of its corresponding data storage disk 806, but in any case in vertically spaced relation to its corresponding data storage disk 806. In this regard, the hard disk drive 800 includes a ramp assembly (not shown) that is disposed beyond a perimeter of the data storage disk 806 to both move the corresponding slider 826 vertically away from its corresponding data storage disk 806 and to also exert somewhat of a retaining force on the actuator arm assembly 812.

Exposed contacts 836 of a drive connector 838 along a side end of the hard disk drive 800 may be used to provide connectivity between circuitry of the hard disk drive 800 and a next level of integration such as an interposer, a circuit board, a cable connector, or an electronic assembly. The drive connector 838 may include jumpers (not shown) or switches (not shown) that may be used to configure the hard disk drive 800 for user specific features or configurations. The jumpers or switches may be recessed and exposed from within the drive connector 838.

As such, provided herein is a method, including selecting a first motor part and positioning the first motor part. In some embodiments, the first motor part includes a surface relative to an electrode and the positioning of the first motor part configures the surface to be electro-chemically machined by the electrode. A first component includes the electrode, and the first component is substantially similar to a motor component. In some embodiments, the first component is substantially similar to a motor sleeve. The method further includes rotating the first motor part relative to the electrode and applying current to the electrode. The method may further include using a magnet to bias motion of the first motor part. The method further includes electro-chemically machining the first motor part.

In some embodiments, the method further includes adding fluid between the first motor part and the first component. The fluid may include an electrolyte configured for electro-chemically machining and the fluid is further configured to form a fluid dynamic bearing with the first component and the first motor part. In some embodiments, the applying of the current to the electrode is configured to modify the form of the first motor part. The form may be selected from the group consisting of flatness, roundness, cylindricity, perpendicularity, taper, and run out. In some embodiments, the electrode is at a surface portion of the first component. The method may further include electro-chemically machining a second motor part connected to the first motor part.

Also provided herein is a method, including rotating a first motor part around a first structure substantially similar to a second motor part and applying a first current to the first structure to electro-chemically machine the first motor part. The first current is applied to an electrode of the first structure. In some embodiments, the electrode is at a surface portion of the first structure. In various embodiments, the first structure is configured to be a portion of an electric motor.

The method may further include adding electrolyte between the first motor part and the first structure. The electrolyte is configured to form a fluid dynamic bearing with the first motor part and the first structure. The method may further include applying a second current to a second structure to electro-chemically machine the first motor part. The method may further include rotating a third motor part within the first structure and the third motor part is connected to the first motor part.

Also provided herein is an apparatus, including a first structure configured to simulate a portion of a motor and a portion of the first structure includes a first electrode. A motor part is configured to rotate relative to the first structure and the first structure is configured to electro-chemically machine a first form tolerance and/or reduced tolerance of size of a first surface of the motor part via the first electrode. In some embodiments, the first structure is coupled to the first motor part. In some embodiments, the first structure includes a second electrode and the second electrode is configured to electro-chemically machine a second motor part connected to the first part.

In some embodiments, the apparatus may include a fluid configured to facilitate electro-chemical machining. In various embodiments, the fluid is further configured to form a fluid dynamic bearing between the first structure and the first motor part. In some embodiments, the apparatus further includes a second structure including a second electrode. The second structure may be configured to electro-chemically machine a second form tolerance and/or reduced tolerance of size of a second surface of the first motor part via the second electrode. The first form tolerance and second form tolerance may be selected from the group consisting of flatness, roundness, cylindricity, perpendicularity, taper, and run out.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. A method comprising:
    positioning a first motor part including a surface relative to an electrode,
        wherein the positioning configures the surface to be electro-chemically machined by the electrode,
        a first component includes the electrode, and
        the first component is substantially similar to a motor component,
    rotating the first motor part relative to the electrode and biasing motion of the first motor part using a magnet;
    applying current to the electrode, and
    electro-chemically machining the first motor part.

2. The method of claim 1, further comprising adding fluid between the first motor part and the first component.

3. The method of claim 2, wherein the fluid comprises an electrolyte configured for the electro-chemically machining, and wherein the fluid is further configured to form a fluid dynamic bearing with the first component and the first motor part.

4. The method of claim 3, wherein the applying of the current to the electrode is configured to modify the form of the first motor part, wherein the form is selected from the group consisting of flatness, roundness, cylindricity, perpendicularity, taper, and run out.

5. The method of claim 1, wherein the first component is substantially similar to a motor sleeve.

6. The method of claim 1, wherein the electrode is at a surface portion of the first component.

7. The method of claim 1, further comprising electro-chemically machining a second motor part connected to the first motor part.

8. A method, comprising:
    rotating a first motor part relative to a first structure,
        wherein the first structure is substantially similar to a second motor part;
    biasing the rotation of the first motor part using a magnet; and applying a first current to the first structure to electro-chemically machine the first motor part.

9. The method of claim 8, wherein the first current is applied to an electrode of the first structure.

10. The method of claim 9, wherein the electrode is at a surface portion of the first structure.

11. The method of claim 8, further comprising rotating a third motor part within the first structure, wherein the third motor part is connected to the first motor part.

12. The method of claim 8, further comprising adding an electrolyte between the first motor part and the first structure, wherein the electrolyte is configured to form a fluid dynamic bearing with first motor part and the first structure.

13. The method of claim 11, further comprising applying a second current to a second structure to electro-chemically machine the first motor part.

14. A method comprising:
rotating a first component and a second component relative to one another, wherein the first component includes an electrode;
biasing rotation of the first component and the second component relative to one another using a magnet; and
applying current through the electrode for electro-chemically machining the second component, wherein the second component is a motor component.

15. The method of claim 14 further comprising:
adding an electrolyte between the first component and the second component.

16. The method of claim 14, wherein the first component includes an insulator and another electrode separated from the electrode by the insulator, wherein the another electrode is configured to apply another current to a third component for electro-chemically machining the third component concurrent with the electro-chemically machining the second component.

17. The method of claim 14 further comprising:
rotating a third component and a fourth component relative to one another, wherein the third component includes another electrode; and
applying another current through the another electrode for electro-chemically machining the fourth component, wherein the fourth component is another motor component.

18. The method of claim 14, wherein the first component is another motor component.

* * * * *